March 11, 1924.
R. W. WELCH
1,486,470
FISHERMAN'S BELT
Filed April 18, 1922    2 Sheets-Sheet 2
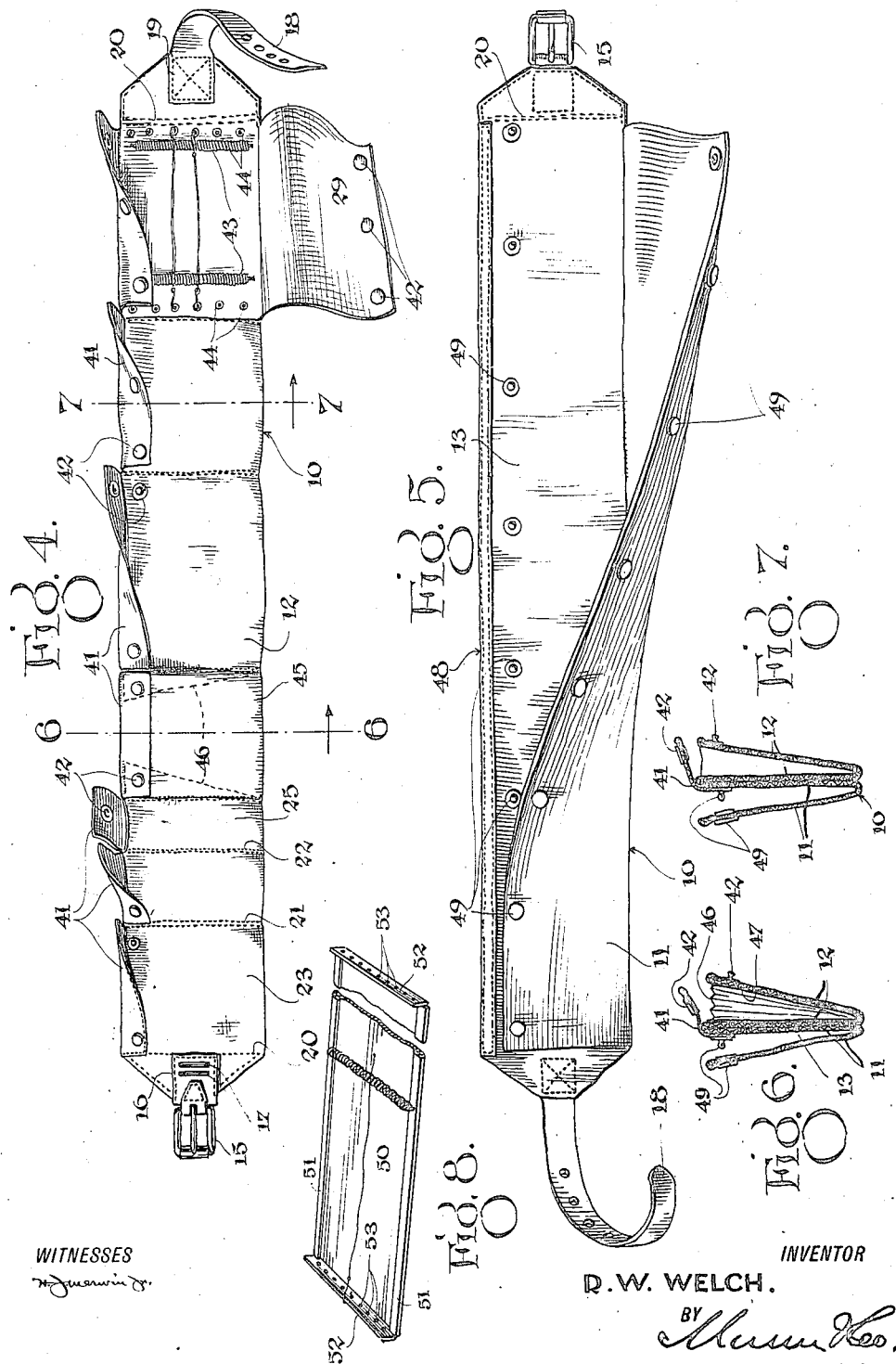
WITNESSES
INVENTOR
R. W. WELCH.
BY
ATTORNEYS Patented Mar. 11, 1924.

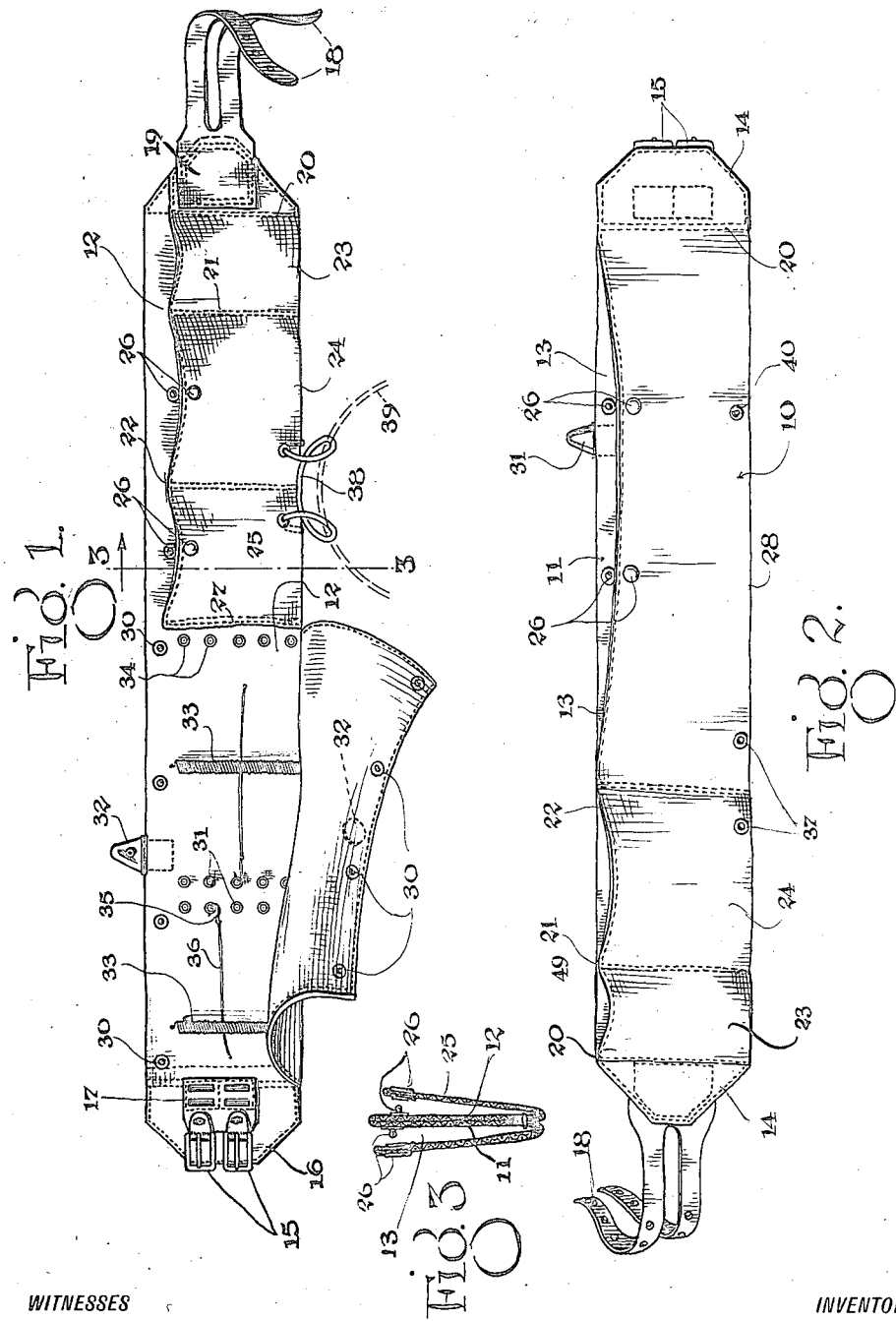

1,486,470

UNITED STATES PATENT OFFICE.

ROY WINSLOW WELCH, OF KELSO, WASHINGTON.

FISHERMAN'S BELT.

Application filed April 18, 1922. Serial No. 554,578.

*To all whom it may concern:*

Be it known that I, ROY W. WELCH, a citizen of the United States, and a resident of Kelso, in the county of Cowlitz and State of Washington, have invented certain new and useful Improvements in Fishermen's Belts, of which the following is a specification.

This invention is a belt of improved construction designed to be worn by fishermen and provided with pockets, openings and other appliances for carrying bait in a can or otherwise, a knife, leaders, artificial bait of any sort and any other necessary articles for use in fishing or on a fishing trip.

It is the object of the invention to provide a novel form of belt adapted to encircle the waist of the wearer and easily applied, as well as to afford easy access to the various articles or accessories including novel means for holding hooks with cat gut or other leaders in such a manner as to permit the application and removal for use, all as will be more particularly pointed out hereinafter and claimed.

A further object of the invention is to provide a belt constituting an improvement upon my prior application S. N. 454,097 filed March 21, 1921 in the construction of the belt proper and the bait holding means or pockets for receiving the bait directly or a can or other receptacle containing the same.

In the accompanying drawing:—

Figure 1 is an outside view of the belt opened out.

Figure 2 is an inside view thereof.

Figure 3 is a transverse sectional view taken on the line 3—3 of Figure 1.

Figure 4 is a view similar to Figure 1 but showing the modified construction.

Figure 5 is a view similar to Figure 2 of the form shown in Figure 4.

Figure 6 is a transverse sectional view taken on the line 6—6 of Figure 4.

Figure 7 is a similar view taken on line 7—7 of Figure 4, and

Figure 8 is a detail view of a modified form of tackle holder.

Referring to the drawings in detail, in which like reference characters designate like parts throughout the several views, and in which for purposes of illustration is shown the preferred embodiments of the invention, and referring more particularly to Figures 1, 2 and 3, the improved belt is shown as comprising a section 10 of leather, canvas or other suitable strong and flexible construction, water-proof or otherwise, in which latter case the same may be lined with rubber or the like or made of oil cloth or similar material, said section being of rectangular or substantially rectangular outline and folded upon itself or doubled on a medial line constituting the longitudinal axis of the section so as to provide inner and outer plies or folds 11 and 12. These folds are then folded upon themselves upwardly and also on the medial lines thereof constituting their longitudinal axis so as to provide outer and inner folds or flaps constituting closures, a pocket 13 being formed between the inner ply and the inner fold or flap forming the inner pocket closure, which pocket is adapted to carry artificial bait, lines or anything one may desire, as well as to prevent the hooks to be hereinafter referred to from coming in contact with the clothing or body. It will be observed that this construction is a doubled central formation or four plies or folds in all, counting the pocket flaps, folds or closures. The ends of the belt may be square or tapered as desired, and the edges or all the sections are folded over and stitched to provide suitable binding or reinforced edges constituting means to prevent the same from fraying out and thereby render the same more durable and to increase the life thereof.

The intermediate portion may be left open or closed, as desired, at the bottom, where folded upwardly to produce the pocket or compartment, the ends being preferably stitched as shown at 14 or otherwise suitably secured together at the sides and shaped in tapered formation or left square for attachment at one end of one or more buckles 15, as through the medium of a tab 16 having spaced pairs of slots 17 designed to receive the adjustable perforated straps 18 extending from a tab 19 stitched or otherwise secured to the outer end of the belt. It is of course to be understood that the straps 18 are first engaged with the buckles 15 so that the device may be adjusted around the waist of the wearer in any desired or convenient position. The ends of the pockets formed by the folds or plies, are closed by the stitching 14 and 20.

Inner rows of the stitching 14 are preferably vertically arranged as indicated at 20 and adjacent thereto at one end are provided vertical rows of stitching 21 and 22 producing front and rear pockets 23 and 24, that is, pockets at the outside and inside of the belt by cooperation of the folds 11 and 12 with the fold 13 for the reception of a knife and leaders or artificial bait of any sort. Another pocket 25 is provided at the front or outside portion adjacent to the pocket 24 for a similar purpose and the flaps of the pockets 24 and 25 at the outside may be closed by snap fasteners or the like 26 in order to retain the contents thereof against displacement. The vertical row of stitching 27 simply connects the fold 12 with the fold 13 constituting the independent center ply of the belt which is stitched to the inside ply or fold 11, as indicated at 28, while the remaining portion of the outside ply or fold 12 is left free along its ends and upper edge, to provide a flap 29 which may be secured against the intermediate folds or ply by a series of fasteners such as snap fasteners 30, which are carried along the cooperating upper edges thereof. If desired, there may be employed in conjunction with or in lieu of the snap fasteners connecting the parts directly a fold, tab or flap 31, cooperating parts of a snap fastener 32 being arranged thereon and upon the outside of the flap 29 so as to secure the latter in a closed position against the intermediate fold 13.

Attached to the fold or ply 13 are a plurality of vertically arranged and flexible springs and coils of wire designated at 33, the same being arranged in parallel relation and two of said springs being preferably employed having their ends or other intermediate parts stitched or otherwise secured to the outer face of the ply 13. These springs are designed to cooperate with a series of rows of eyelets 34 vertically arranged parallel thereto, to carry a number of hooks of different sizes, flies or the like, as shown at 35, with the leaders 36 thereof engaging the coils of the springs so as to retain the leaders in position lengthwise of the belt, the back ply or fold at the inside designated at 11 serving to protect the body from the hooks. As shown, two rows of eyelets 34 are arranged between the springs 33 and another row intermediately of the length of the belt adjacent to the stitching 27, the parts being so proportioned as to accommodate different sized hooks and leaders of different lengths, as may be accommodated within the length of the pocket covered by the flap 29, thus permitting one to carry a variety of such devices in connection with the other necessary equipment or accessories for use in fishing. Obviously, the different pockets or compartments may be arranged in other relations than that set forth above, so long as the same does not depart from the spirit of the invention as will be subsequently claimed. However, the bottom edge of the belt is preferably provided with a pair of eyelets 37 by which a bait can or other equipment may be supported, and as shown, a wire support 38 is employed engaging the pan 39, but other suitable supporting means may be used. An additional eyelet 40 is also provided for engagement by a hook or fastening means of a landing net or the like, as constitutes an important item in fishing.

In the form of the invention shown in Figures 4, 5 and 6, the construction is the same, except that the pockets are secured in closed positions by flaps 41 folded over and secured at the top of the back ply or flap 13, fasteners 42 being carried by the flap and front fold respectively in order to close the pockets. Any number of compartments or pockets may be employed for carrying the necessary equipment as above explained, the pockets being separated by vertical rows of stitching as heretofore explained. In this form of the invention, the springs 43 are arranged in parallel relation and outwardly thereof are disposed rows of eyelets 44 for accommodating the hooks, the leaders extending across the springs and being held between the coils thereof. In addition, one of the flaps designated at 45 is provided with collapsible end walls 46 so that the compartment or pocket formed thereby with the intermediate or central ply or fold 13 may be used for holding bait, with or without a can. This compartment is also preferably lined with water proof material as indicated at 47 so as to prevent the same from soiling the belt or injuring the clothing of the wearer. In this construction, the inside pocket may be formed of a separate strip folded at the bottom and secured by a continuous flap 48 stitched or otherwise secured along or at the top of the intermediate portions, or the inner and outer plies 11 and 12, but preferably the former as through the medium of a series of fasteners 49 preferably of the ball and socket or glove fastener type. These fasteners may be readily snapped together or unfastened as it is thought will be obvious in order that convenient access may be had to the various compartments or pockets as desired. The flap or fold 48 may be used for all of the pockets or flaps thereof to carry the fastening means or fasteners but especially at the front or outside.

In Figure 8 of the drawings a modification of tackle holder is shown, for supporting or carrying hooks with leaders, flies and the like. In this form a metal plate 50 preferably of aluminum, having its edges 51 turned to prevent wear on the belt where it comes in contact therewith, is secured in position to the material 12 as by sewing, eyelets, or in any other suitable way. The ends of the plate are turned outwardly or perpendicularly to stand upright as indicated at 52, and the latter portions provided with holes or eyelets 53 for receiving hooks, sufficient space being thus provided, and the belt prevented from collapsing at this place.

In view of the foregoing, it will be manifest that I have provided a very desirable and economical form of belt for fishermen's use in which the various articles will be within convenient reach when needed and rendering the device especially useful in trout fishing or in fishing in other inaccessible places, where it is not convenient to carry a bag or other necessary equipment, as when standing on shore or on a boat.

Having thus described the invention what I claim as new is—

1. A fisherman's belt comprising a strip of flexible material, said strip being folded intermediately downwardly and then upwardly at each side to form a double intermediate portion, means at the ends thereof for adjustably connecting the same around the waist of the wearer, said belt having a series of pockets at the outside and a protector strip at the inside.

2. A fisherman's belt comprising a strip of flexible material, said strip being folded intermediately downwardly and then upwardly at each side to form a double intermediate portion, means at the ends thereof for adjustably connecting the same around the waist of the wearer, the upwardly folded inner and outer portions being formed into pockets against the intermediate portions and fastening means for securing said pockets in closed positions.

3. A fisherman's belt comprising a strip of flexible material, said strip being folded intermediately downwardly and then upwardly at each side to form a double intermediate portion, means as the ends thereof for adjustably connecting the same around the waist of the wearer, the upwardly folded inner and outer portions being formed into pockets against the intermediate portions and fastening means for securing said pockets in closed positions, said fastening means including a strip secured along the top edge of the intermediate portions, connecting means between said strip and the front pocket and connecting means between the upwardly bent inner fold and the intermediate portions below said strip.

4. A fisherman's belt comprising a strip of flexible material, said strip being folded intermediately, downwardly and then upwardly at each side to form a double intermediate portion, and means at the ends thereof for adjustably connecting the strip around the waist of a wearer.

ROY WINSLOW WELCH.